United States Patent [19]
Wolf et al.

[11] Patent Number: 5,316,338
[45] Date of Patent: May 31, 1994

[54] ARRANGEMENT FOR ENDWISE TRANSPORT OF AN IMPLEMENT

[75] Inventors: Helmut Wolf, Homburg-Einoed; Gerd Bramstedt, Zweibruecken; Xaver Mak, Zweibruecken; Fritz Mak, Zweibruecken, all of Fed. Rep. of Germany

[73] Assignee: Deere & Company, Moline, Ill.

[21] Appl. No.: 872,875

[22] Filed: Apr. 23, 1992

[30] Foreign Application Priority Data

Apr. 24, 1991 [DE] Fed. Rep. of Germany ....... 4113299

[51] Int. Cl.$^5$ ............................................. B62D 63/06
[52] U.S. Cl. .................................. 280/789; 280/142; 280/143; 280/656
[58] Field of Search ................. 280/82, 140, 142, 143, 280/414.1, 415.1, 475, 476.1, 514, 515, 656, 763.1, 789, DIG. 8, DIG. 14, DIG. 15

[56] References Cited

U.S. PATENT DOCUMENTS

| | | | |
|---|---|---|---|
| 4,385,483 | 5/1983 | McIlwain | 56/228 |
| 5,040,825 | 8/1991 | Kuhns | 280/789 |

FOREIGN PATENT DOCUMENTS

| | | | |
|---|---|---|---|
| 2644360 | 1/1984 | Fed. Rep. of Germany. | |
| 1579838 | 7/1990 | U.S.S.R. | 280/789 |

OTHER PUBLICATIONS

Wetherell brochure, "Combine Head Transport", not dated but prior to Apr. 24, 1991.

*Primary Examiner*—David M. Mitchell
*Assistant Examiner*—Andrew C. Pike

[57] ABSTRACT

Transport arrangements for cutting heads or the like have previously been configured as independent one or two-axle trailers upon which the implement could be deposited. The disadvantage is that thereby a self-supporting construction is required which entails high costs. In another known embodiment a two wheel trailer is attached to both the front and the rear end of the implement, which is costly and increases the length of the complete rig. The transport arrangement proposed consists of a draft tongue and a trailer, where the tongue is inserted into and secured to the implement and the trailer is attached underneath the implement. Transport arrangements of this type are used to transport agricultural implements.

8 Claims, 3 Drawing Sheets

ARRANGEMENT FOR ENDWISE TRANSPORT OF AN IMPLEMENT

BACKGROUND OF THE INVENTION

The present invention concerns a transport arrangement for an implement having a frame, and more particularly relates to such arrangements that are releasably connected to an implement frame so as to make the latter mobile in the endwise direction.

Transport arrangements are used to accommodate implements such as sowing machines, ground working tools, crop pick-up arrangements, cutter heads, picker attachments and the like in such a way that they can be towed behind a vehicle. In most cases the implements are those that exceed the maximum allowable width permitted on public roads, and therefor cannot remain in transverse position on the vehicle in public traffic. The vehicle concerned is usually an agricultural tractor, a combine, a forage harvester, a gang mower or the like, that is, the vehicle to which the implement is attached during operation.

Conventionally such transport arrangement uses one-axle or two-axle wagons that contain a longitudinal frame with contact surfaces and that can be connected to a towing hitch provided on the vehicle. Since these transporters must often accommodate implements which together with the transporters have a total working width/transport length of up to 6 meters, they are not only relatively bulky, but their manufacture entails excessively high production costs.

In contrast thereto, German Patent No. 2,644,360 issued Apr. 21, 1977 proposes a transport arrangement in which an adapter is provided at the forward and the rear ends of the implement, when considered in its endwise transport position, to each of which a support having two wheels can be attached. The forward wheeled support includes a tongue adapted to be coupled to a vehicle drawbar.

This transport arrangement has the disadvantage that it requires two wheeled supports and that the two wheeled supports considerably extend the length of the entire rig, which is undesirable in view of the transport mobility.

Another transport arrangement is disclosed in U.S. Pat. No. 4,385,483, issued May 31, 1983, as including a pair of wheels mounted in stored positions adjacent one end of the implement, with one wheel being pivotable to a transport position and the other being removable from storage and remountable to the implement in a transport position across from the one wheel so as to support the one end of the implement for being pulled endwise through means of a hitch telescopically attached to the other end of the implement.

While this last mentioned transport arrangement does not significantly add to the transport length of the implement, the implement structure is complicated by the need to provide brackets for storing the wheels and, due to the transport arrangement being attached to or carried by the implement, it is not possible to use the transport arrangement for transporting a different implement.

SUMMARY OF THE INVENTION

According to the present invention there is provided an improved transport arrangement for permitting an implement to be towed endwise by a vehicle.

A broad object of the invention is to provide a transport arrangement which is of simple, inexpensive construction.

A more specific object of the invention is to provide a transport arrangement, for an implement, including only one wheeled support and a tongue, with the support being releasably attached to a rear end of the implement, as considered in its transport position, and with the tongue being located at the forward end of the implement.

A further object of the invention is to provide a transport arrangement for an implement wherein the combined length of the implement and transport arrangement is not significantly more than the length of the implement itself, this object being accomplished by the arrangement including a two wheeled support mounted underneath the implement.

Another object of the invention is to provide a transport arrangement for an implement wherein the wheeled support is in the form of a two wheel trailer including a tongue stored thereon which may be used for towing the wheeled support apart from the implement.

Still another object of the invention is to provide a transport arrangement for an implement including a retaining arrangement including a length adjustable support element for permitting the transport arrangement to be used with different implements.

These and other objects of the invention will become apparent from a reading of the ensuing description together with the appended drawings.

DESCRIPTION OF THE PREFERRED EMBODIMENT

Figure 1:
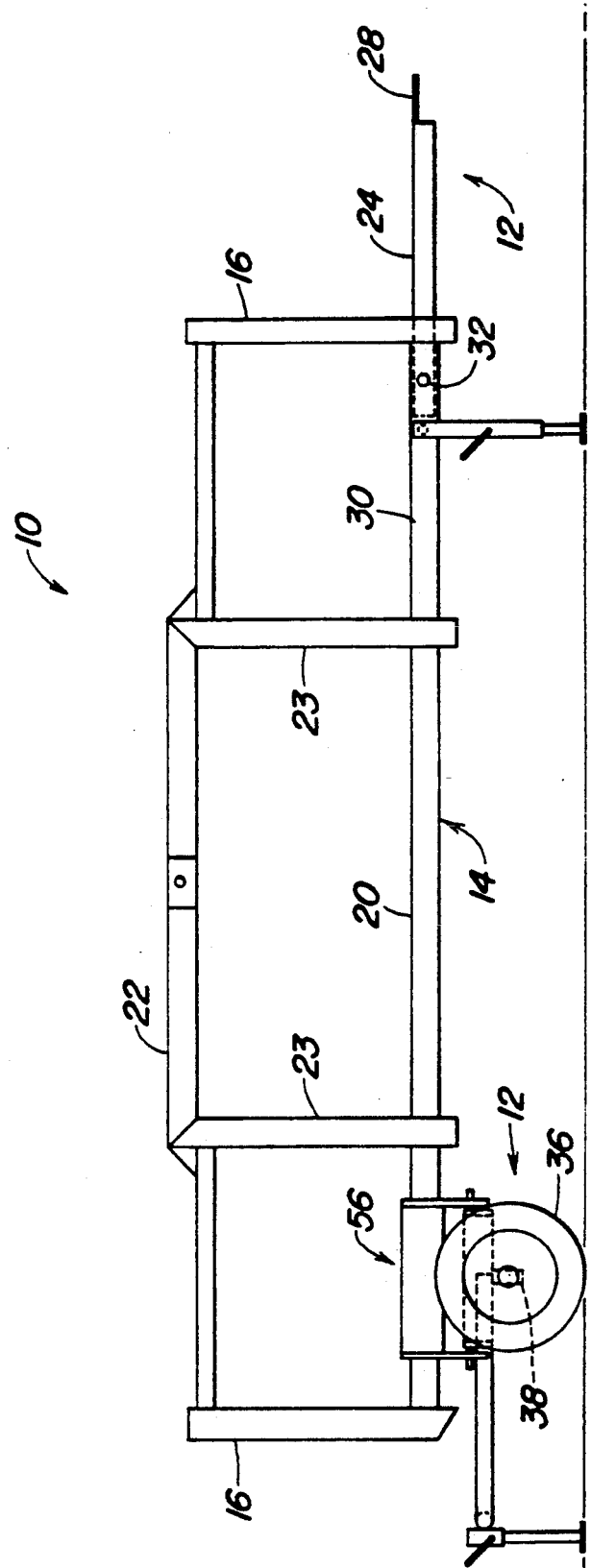
FIG. 1 shows a somewhat schematic side view of an implement with a transport arrangement constructed in accordance with the present invention.
Figure 2:
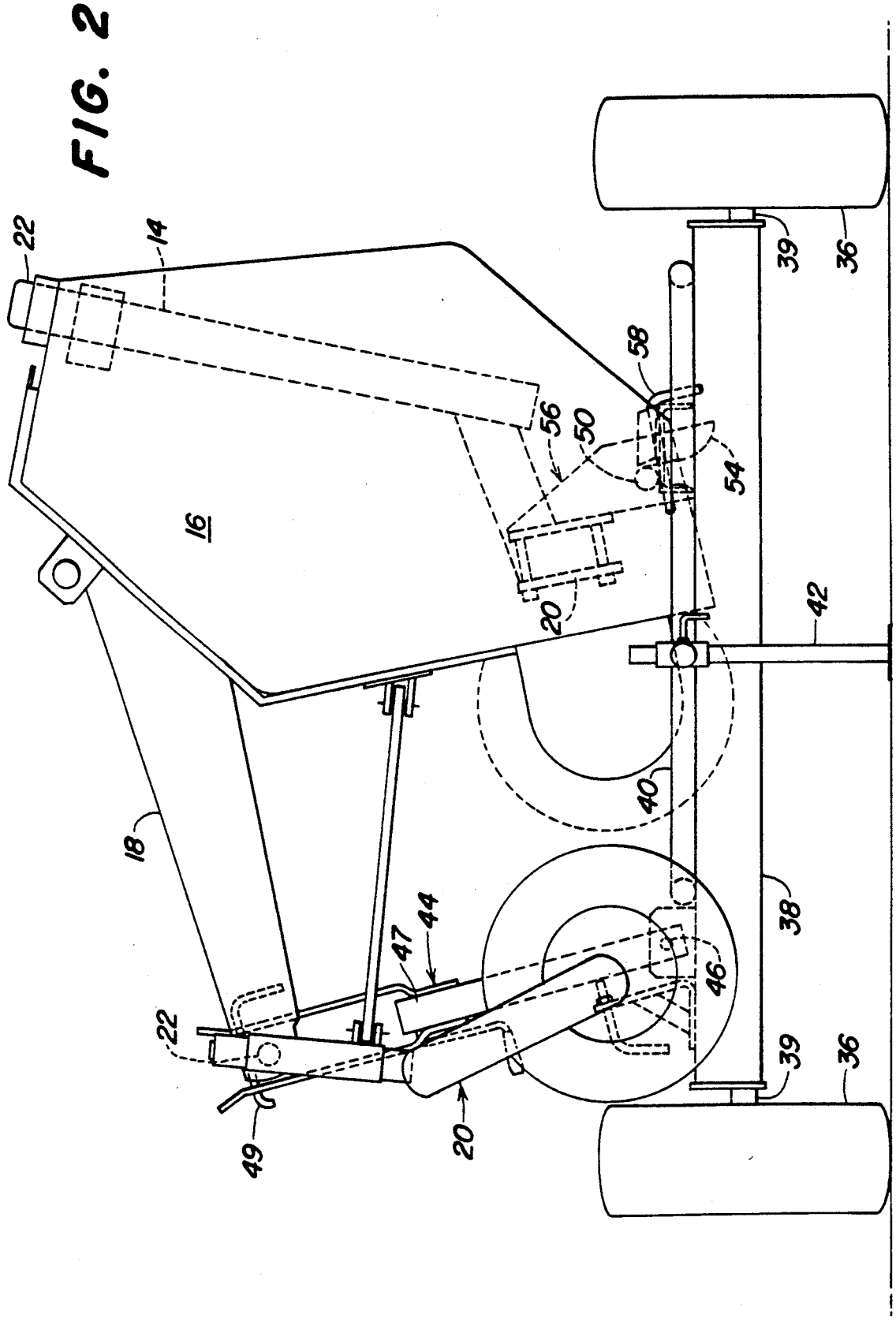
FIG. 2 shows an end view of an implement with the transport arrangement.

Referring now to FIGS. 1 and 2, there is shown an implement 10 supported on a transport arrangement 12, portions indicated at two different locations, for being towed across the ground.

In this case the implement 10 is a so-called pick-up that can be attached to the front of a forage harvester. The implement 10 is shown only in outline and has a frame 14 extending between and joined to opposite end structures 16. The end structures 16 each include an upper leftwardly (FIG. 2) projecting wheel support arm 18 having a caster wheel assembly 20 mounted to its outer end. A cross tube or bar 21 extends widthwise of the implement 10 between and is joined to outer end locations of the arms 18. Thus, the cross tube is located to an extreme side of the implement 10 from the center of mass of the latter.

The frame 14 comprises a tubular beam 22, extending between and being joined to central lower locations of the opposite end structures 16 and an upper stepped tubular beam 23 extending between upper locations of the end structures. Upright cross struts 24 are welded between the beams 22 and 23 at respective longitudinally spaced locations thereof. The cross section of the each of the beams 22 and 23 is preferably multi-cornered, but it may also be round.

Extending between and having opposite ends supported by the end structures 16 are an auger (not shown) and a pick-up unit 25 including teeth which operate between guide vanes. The frame 14 also supports the operating elements (not shown) of the implement 10 for driving the auger and pick-up unit. Such an implement 10 may extend to a width of 4 meters and must be towed endwise behind a vehicle during travel on public roads.

The transport arrangement 12 is provided for such endwise towing and includes a draft tongue 26 and a two wheel trailer 27. In this embodiment the tongue 26 has a straight-line configuration, it could also be curved. Its length is such that it extends from a lower location of the frame 14 to a towing hitch, not shown, on a vehicle, while leaving sufficient free space between the vehicle and the implement for turning. Considered in the direction of forward endwise movement of the implement, the forward end of the tongue 26 is provided with a towing connector 28. At the end opposite the towing connector 28, the tongue 26 is shaped so that it can be inserted into the longitudinal beam 22, which extends through the end structure 16 with a forward end portion thereof forming a retainer 30 for holding the tongue 26 when the implement is mounted on a vehicle. In the region of the retainer 30, at least one locking device 32 is provided that extends through openings that are aligned with each other in the retainer 30 and the tongue 26 and thereby establishes a positive locking connection between these parts. If the beam 22 and therewith also the retainer 30 and at least the mating section of the tongue 26 is multi-cornered, the tongue 26 is held fixed against rotation in the retainer 30 so that the locking device 32 is required only to prevent axial movement between the tongue 26 and the retainer 30. The tongue 26 could equally well be bolted to the side of the retainer 30. If the tongue 26 including the connector 28 is a straight-line component over its entire length and is dimensioned such that there is sufficient clearance in the retainer 30, then the tongue 26 can be pushed entirely into the retainer 30 and thereby into the longitudinal tube 20 so that it does not extend beyond the end structure 16 of the implement 10.

Figure 3:
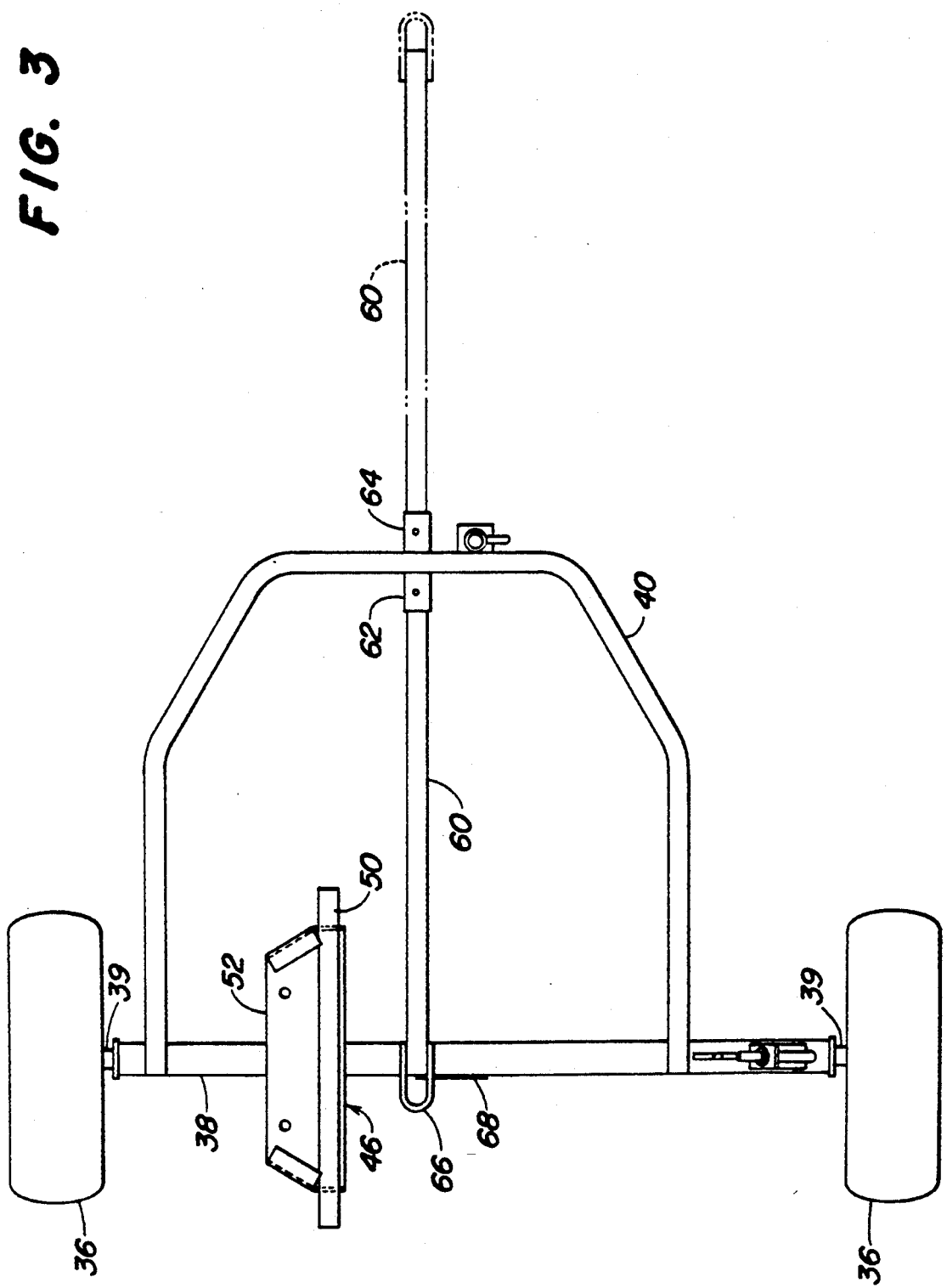
FIG. 3 is a top plan view of the two-wheel trailer of the transport arrangement.

Referring now also to FIG. 3, it can be seen that the two wheel trailer 27 is composed in particular of wheels 36, an axle 38 and, beyond that by a frame 40, a support leg 42, a retaining arrangement 44 and a first attaching device 50. Finally it contains a draft tongue 60. The wheels 36 are neither driven nor steerable and rotate about a common axis of rotation. While only single wheels 36 are shown at each end of the axle 38, dual wheels may be provided for a total of four wheels.

The wheels 36 are mounted on the ends of the axle 38, free to rotate, by spindles 39 which extend within and are fixed to the axle 38. The axle 38 together with the spindles 39 has a length so as to result in the wheels 36 being located at opposite sides of the implement 10 when the trailer is attached to the latter for transport. The axle 38 may be a simple cross bar or tube and is required only to provide structure to which the spindles 39 may be mounted.

The trailer frame 40 extends more or less in a horizontal plane and is configured in a U-shape in that plane, the ends of whose legs are oriented crosswise to and are secured to the axle 38. The legs of the frame 40 can be rigidly attached to the axle 38 or can be inserted into and retained in respective sleeves (not shown) provided on the axle. The base of the U-shape is oriented crosswise to the implement 10 and can be utilized to manually maneuver the trailer 27. The legs of the frame 40 are long enough to permit an operator to push the trailer 27 under the implement 10 to the selected position. In this embodiment the support leg 42 comprises a cylindrical tube that is telescopically received in a cylindrical sleeve welded in a vertical orientation to the base of the frame 40. The leg 42 is releasably held in the tube so that its effective length may be varied. The support leg 42 may alternatively be attached to the frame 40 so as to pivot and be swung from an operating to a nonoperating position. It will be appreciated that, due to the weight of the frame 40 and support leg 42, the trailer 27, when separated from the implement 10, will tend to rotate counterclockwise (FIG. 1) about the axis of rotation of the wheels 36 and is supported on the ground by the support leg 42. Hence the trailer 27 does not tip over when it is brought into the correct position under the implement 10 for receiving the same from the vehicle carrying the implement.

The retaining arrangement 44 (FIG. 2) is provided for attaching the implement 10 to the trailer 27. Specifically, the arrangement 44 includes an elongate structure having one end pivotally attached, as at 46, to the axle 38. The arrangement 44 is of a conventional configuration and includes a length adjustable strut 47, for example a screw jack, that is provided with a fork 48 at its upper end which, through adjustment of the strut 47, can be located so that the cross bar 21 is received therein. A latch pin 49 is inserted through elongate openings in the legs of the fork 48 so as to extend above and retain the cross bar 18 in the fork. The adjustment of the strut 47 makes it possible to mount implements of somewhat different dimensions to the trailer 27. A first attaching device 50 (FIG. 3) is rigidly attached to the axle 38 and includes a long horizontal coupling pin 51 welded to the top of the web of a channel member 52 extending crosswise to the axle 38 and having notched legs receiving and being welded to the axle. The pin 51 is longer than the channel member 52 and has opposite end portions extending therebeyond for being engaged from above by respective downwardly opening hooks or forks 54 (FIG. 2) of a cooperating second attaching device 56 which is rigidly attached to the beam 20. When the hooks 54 have been lowered, by lowering the implement while mounted on the vehicle, so as to receive the pin 51 therein, a locking engagement is obtained between the hooks 54 and the pin 51 by inserting a latch pin 58 through aligned holes provided in each of the hooks 54 at locations below the pin 51. It is here noted that when not in use the latch pins 58 may be stored in holes 59 provided in the web of the channel member 52.

While the second attaching device 56 is shown attached to the beam 22, it or additional ones of such devices can be provided at appropriate locations on the cross struts 24 or other structure making up or supported by the frame 14. Furthermore the design of the implement 10 will determine whether the attaching devices 50, 56 are provided on both sides of the implement 10 or only on one side. Thus, the implement 10 is supported on the trailer 27 without any danger of loss, or without any danger of tilting because of its unbalanced weight, by the strut 47 and the cooperating first and second attaching devices 50 and 56, respectively.

Alternatively, instead of the attaching devices 50 and 56, a first adapter (not shown) that can fit between two adjacent cross struts 24 can be applied to the upper side of the axle 38 by welding or bolting and a second adapter (not shown) can be mounted in the space between two adjacent cross struts 24 and formed for having the first adapter fit therein exactly and thereby would be able to absorb the towing forces between the implement 10 and the trailer 27.

Finally, as can be seen in FIG. 3, the draft tongue 60 is movable between a towing position, shown in broken lines in FIG. 3, and a stored position, shown in solid lines. Specifically, fixed, as by welding, to opposite sides of the base of the U-shaped frame 40 along a central axis of the frame extending crosswise to the axle 38 are identical oppositely opening cylindrical tubular storage and working sockets or receptacles 62 and 64, respectively. The tongue 60 is formed of cylindrical tubing and has an end received in the storage receptacle 62 when the tongue 60 is in its stored position, a hitch connector 66 at the other end of the tongue then being captured by a latch strap 68 mounted to the axle 38. To place the tongue 60 in its working position, one need only to remove the latch strap 68 from the connector 66, remove the tongue end from the storage receptacle 62 and then insert the tongue end into the working receptacle 64.

In lieu of the tongue 60, the trailer 27 could be provided with a receptacle fixed to the axle and sized for receiving the tongue 26 that is used to tow the implement with the trailer supporting the trailing end thereof as shown in FIG. 1.

After all that, it can be seen that the transport arrangement 12 utilizes the frame 14 of the implement 10 as a connection between its tongue 26 and its trailer 27 and hence can perform its function without any increase in its own length.

In order to install the implement 10 on the transport arrangement 12, the chassis 26 is positioned beneath the elevated implement so that the connecting devices 50 and 56 are aligned. Assuming that a second person is not available for holding the trailer 27 in position while a first person operates the vehicle to lower the implement 10 onto the trailer, the support leg 42 is lowered into ground engagement for supporting the trailer 27. Following this, the implement 10 is lowered until the forks 54 are brought into engagement with the opposite end portions of the pin 51. The latch pins 58 are then inserted through the legs of the forks to positively lock the implement 10 to the trailer 27. Then the implement 10 is stabilized by connecting the adjustable strut 47 between the cross tube 21 and the axle 38. The support leg 42 is then adjusted to its nonoperating position. Finally the tongue 26 is pulled out of the retainer 30 and secured by the locking device 32. If a support is attached to the tongue 26 or the implement 10, it is brought into its operating position until the now mobile implement 10 is coupled. Finally the implement 10 is separated from the vehicle and the tongue 26 connected to its towing hitch.

When the implement 10 is mounted to the vehicle and the trailer 27 is thus not being used to transport the implement, the tongue 60 of the trailer is moved to its transport or working position so that the vehicle carrying the implement or some other motorized vehicle may be used to pull the trailer from place to place, it being noted that the trailer is available for use with more than implement.

We claim:

1. In a combination of a transport arrangement and a wide implement wherein the transport arrangement is mounted for use in the endwise transport of the implement and includes an elongate frame forming an axle having a wheel at each of opposite ends thereof, said axle extending crosswise beneath and being attached to the implement at a location forwardly of a rear end of the implement, as considered in a direction for forward endwise transport of the implement and constituting the sole support for supporting said rear end of the implement during transport thereof, with a forward end of the implement being equipped with a tongue for connection to a towing vehicle which supports said forward end during transport of the implement, the improvement comprising: said axle having a first attaching structure fixed thereto; said implement having a main frame extending widthwise of the implement; a second attaching structure being mounted to said main frame at a location forwardly of said rear end of the implement; one of said first and second attaching structures defining a receptacle having an entrance and the other of said first and second attaching structures including a mating part releasably received in said receptacle; a latch mounted for selectively blocking said entrance of the receptacle for releasably retaining the mating part in the receptacle, whereby the axle together with the wheels may be easily and quickly attached to and detached from the implement.

2. The combination defined in claim 1 wherein said receptacle is mounted to the implement and comprises a pair of downwardly opening hooks spaced from each other in said direction of endwise transport of said implement; and said first attaching structure comprising a mounting pin structure having respective portions releasably received in said hooks.

3. The combination defined in claim 1 wherein a maneuvering frame is fixed to said axle and projects rearwardly beyond said rear end of the implement, as considered relative to said forward direction of endwise transport, whereby said maneuvering frame may be grasped by an operator to maneuver the axle so as to correctly position the latter for bringing the mating parts of the first and second attaching members into engagement with each other during releasably securing the implement to the axle.

4. The combination defined in claim 3 wherein said axle and maneuvering frame form part of a trailer; said maneuvering frame including a tongue receptacle mounted in rearwardly spaced relationship from said axle and located along an axis intersecting the axle at a right angle, whereby a first end of the tongue receptacle opens towards said axle while an opposite second end of the tongue receptacle opens away from said axle; a latch being mounted on said axle at a location adjacent said axis; and a trailer tongue being mounted in a stored position with a first end thereof inserted in said first end of the tongue receptacle and a second end thereof engaged by said latch, and moveable to a working position wherein the latch is disengaged and the trailer tongue is removed from the first end and inserted into the second end of the tongue receptacle, whereby the trailer may be towed when it is separated from the implement.

5. The combination defined in claim 4 wherein a support leg is adjustably mounted on said maneuvering frame at a location adjacent said tongue receptacle, for movement between a retracted position, wherein the support leg is clear of the ground, and a support position wherein the support leg is in engagement with the ground and holds the maneuvering frame in a correct attitude for the mating parts of the first and second attaching members to be brought into engagement with each other during attachment of the implement to the axle.

6. The combination defined in claim 1 wherein said implement is of a type having a structural cross member extending widthwise of the implement, as considered in a working position, and spaced to one side of a center of mass of the implement; and a strut having a lower end pivotally mounted to said axle and having an upper end releasably attached to said cross member, to thereby stabilize the implement on the axle.

7. The combination defined in claim 6 wherein said strut is length adjustable, whereby implements of different sizes having their cross members located at different distances from the axle may be stabilized on the axle.

8. The combination defined in claim 7 wherein said cross member is in the form of a bar and said strut having a forked upper end receiving said bar; and a latch pin releasably received in the forked upper end so as to releasably retain the cross member in the forked upper end of the strut.

* * * * *